Feb. 20, 1934.     C. H. NORDELL     1,948,125
SCREEN
Filed April 11, 1932    2 Sheets-Sheet 1

Inventor:
Carl H. Nordell,
by Charles J. Hervey
his Atty.

Feb. 20, 1934.  C. H. NORDELL  1,948,125
SCREEN
Filed April 11, 1932  2 Sheets-Sheet 2
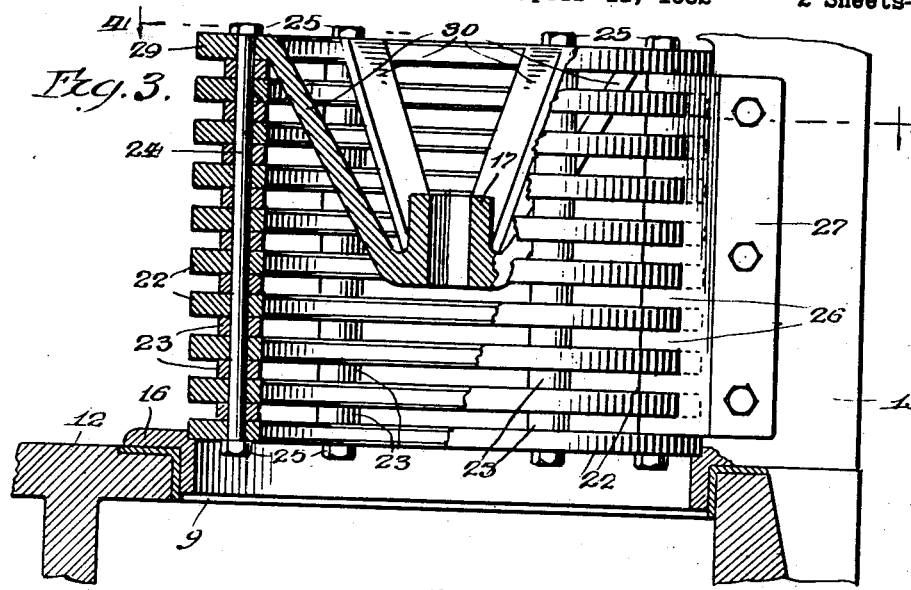
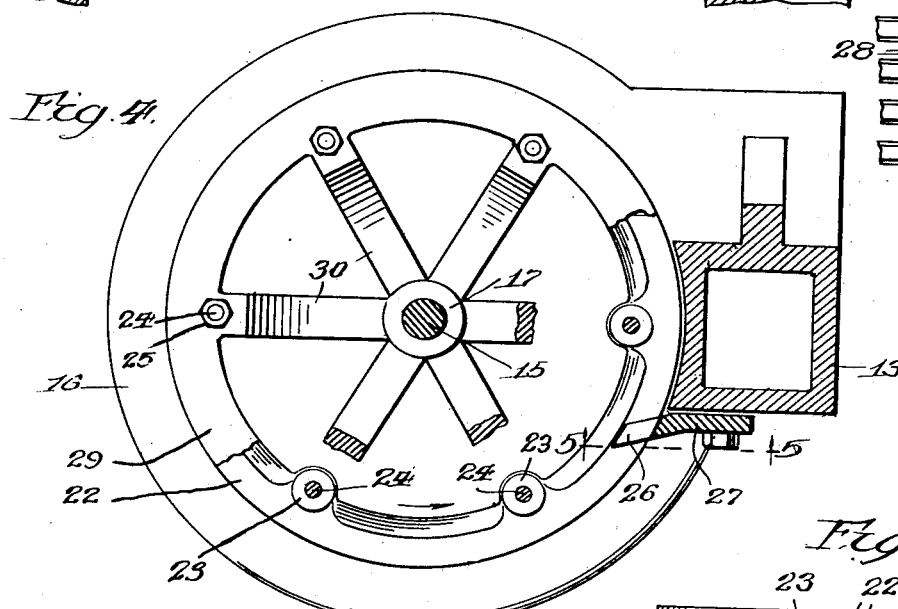
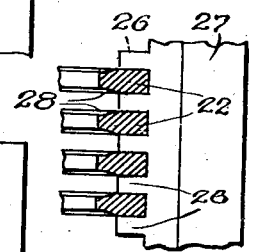
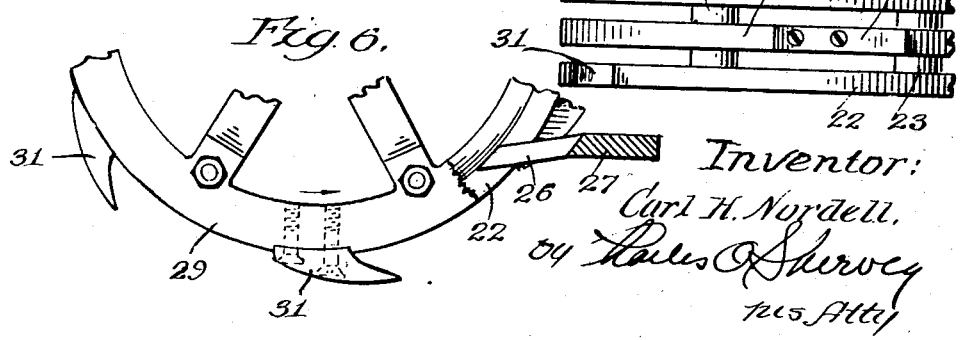

Patented Feb. 20, 1934

1,948,125

UNITED STATES PATENT OFFICE 1,948,125

SCREEN

Carl H. Nordell, Chicago, Ill.

Application April 11, 1932. Serial No. 604,511

5 Claims. (Cl. 210—152)

This invention relates to screens, and more particularly to screens of that character which are employed for screening out debris, trash and other solid and semi-solid matter from water or other liquids. Screens of this character are employed in sewage disposal plants for removing the debris, trash and other solid and semi-solid substances from the sewage before the sewage is further treated in the plant. In many establishments water from streams, lakes and other pools, is employed for various purposes, and the screen has been designed for use in situations of this kind.

The difficulty encountered with screens heretofore used is that of preventing the screens from becoming clogged, and various expedients have been resorted to with a view towards removing this objectionable feature. One of the objects of the present invention is to provide a screen having continuous openings therein, whereby the openings are constantly kept clear, thereby eliminating any possibility of clogging.

Another object is to provide a screen constructed of similar units which may be readily assembled to provide a screen for any desirable capacity and to provide a screen having openings of any desirable size.

Another object is to provide a screen which is strong, substantial and capable of withstanding the hard usage to which screens of this character are usually put.

To such ends this invention consists in a screen composed of a multiplicity of ring-like screen units secured together and suitably spaced apart to provide continuous openings therebetween, in combination with cleaning means entering the spaces between the ring-like units, one of said elements being rotatable relative to the other, whereby the spaces between the rings are constantly kept free from the material which is being separated from the water, and which ordinarily collects in the screen openings.

The invention further consists in a screen composed of spaced ring-like screen units secured together and provided with a hub within the hollow of the screen and connected with one end thereof.

The invention further consists in a screen composed of ring-like units secured together and having means on the exterior of the rings for breaking up solid material which is carried to the screen.

The invention further consists in the several novel features of construction, arrangement and combination of parts hereinafter fully set forth and claimed.

The invention is clearly illustrated in the drawings accompanying this specification in which—

Fig. 3 is a detail fragmental view of the screen, partly in side elevation and partly in vertical section;

Fig. 4 is a view, partly in plan and partly in horizontal section, taken on the line 4—4 of Fig. 3;

Fig. 5 is a detail fragmental vertical section taken on the line 5—5 of Fig. 4;

Fig. 6 is a fragmental plan of the screen illustrating an additional feature; and Fig. 7 is a fragmental side elevation of the screen seen in Fig. 6.

Figure 1:
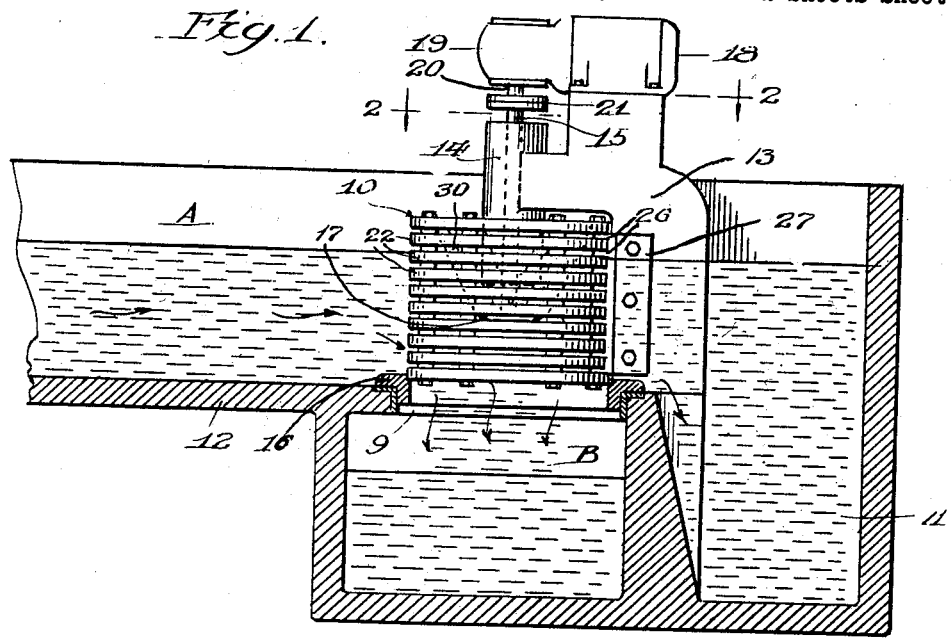
Figure 1 is a view, partly in side elevation and partly in vertical section, of a screen embodying a simple form of the present invention and showing the same applied to the conduits which convey the water to and from the screen, the line of section being indicated at 1—1 in Fig. 2.

Referring to said drawings, and first to Figs. 1 to 5, inclusive, the reference character A designates an influent channel through which the unscreened water is conveyed to the screen, and B designates the effluent channel through which the screened water is conveyed away therefrom. These channels may be in the form of concrete structures, if desired, and may be of any desirable form for conveying water or other liquids.

The effluent channel leads from and is located below the influent channel and is connected thereto through an opening 9 which is protected by the screen proper, shown generally at 10. At the end of the influent channel A is a pocket 11 wherein the debris, trash and other solid matter carried along by the influent water is deposited and from which it is removed by suitable mechanism (not shown).

Supported upon the bottom wall 12 of the influent channel is a standard 13 of strong and substantial construction which is formed with a bearing bracket 14 overhanging the opening 9 and adapted to contain bearings for the screen shaft 15. Extending over and fitted into the opening 9 is an annular base 16 which is formed as a part of the standard 13. The screen extends upward from said annular base and rotates therein.

The bearing bracket 14 projects down into the hollow of the screen and the latter is provided with a hub 17 secured to the screen shaft 15 directly below the lower end of the bearing bracket 14. The screen is driven from any suitable source of power, and it is here shown driven from an electric motor 18 mounted upon the top of the standard 13 and provided with speed reducing gearing 19, the low speed shaft 20 of which is connected to the screen shaft 15 by a shaft coupling 21.

The screen 10 is desirably composed of a plurality of ring-like screen units 22 spaced apart by interposed washers 23 and secured together by rods or long bolts 24 having nuts 25 upon their ends engaging with the outermost screen units. The washers 23 are located inwardly some distance from the peripheral edges of the screen units so as to leave free annular spaces outwardly of the washers into which extend the teeth 26 of a comb 27 which is bolted or otherwise secured to the standard 13.

The sides of the screen units are desirably parallel with each other for some distance inward from the outer peripheries of the screen units beyond which they are relieved, as is illustrated at 28 in Fig. 5, and the teeth 26 of the comb are fitted to said free spaces and serve to clear said spaces from any material that might otherwise tend to lodge or collect therein and clog the screen. Desirably the teeth of the comb are disposed in a tangential direction with respect to the screen to facilitate the removal of any matter that encounters the teeth.

The screen units, with the exception of the uppermost one, are similar in construction and are machined accurately to size and shape. The uppermost screen unit 29 is formed with a spider 30 which extends down into the hollow of the screen toward the middle thereof where the arms of the spider are united to the hub 17.

Figure 2:
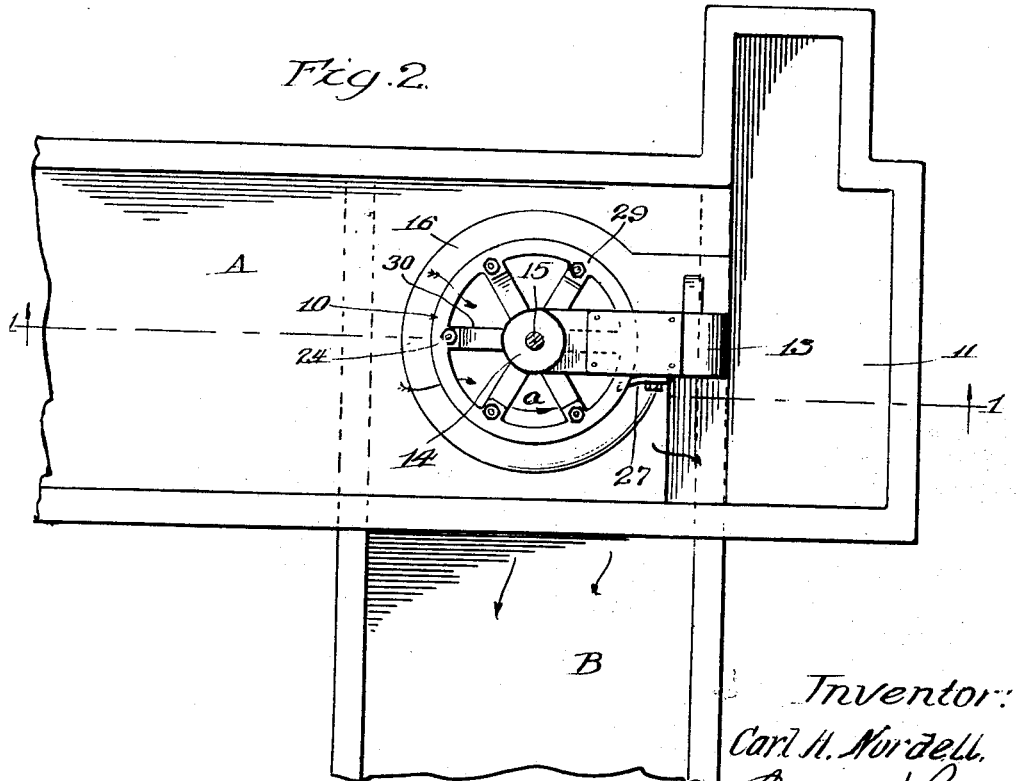
Fig. 2 is a view, partly in plan and partly in horizontal section, the line of section being indicated at 2—2 in Fig. 1.

In operation, the screen is rotated in the direction of the arrow a in Fig. 2, and the water passes through the spaces between the screen units into the hollow of the screen and discharges through the opening 9 into the effluent channel B. The water is not permitted to enter the screen through its open top. Any solid matter which is too large to pass through the spaces between the screen units discharge into the pocket 11 from which it is removed by any suitable means. Any matter which tends to collect in the spaces between the screen units encounters the teeth of the comb and is removed from the screen. Desirably the screen is rotated at a relatively high speed, as, for instance, sixty revolutions per minute, and from this it will be observed that the openings in the screen are effectively and continuously kept clear, thereby preventing any foreign matter from clogging the screen.

The screen is very easily assembled and may be constructed of any desirable length. Moreover, by selecting washers of the proper thickness the sizes of the openings may be regulated to suit any particular requirement.

With the use of the continuous free spaces between the screen units, a rigid toothed comb may be used to keep the spaces clear of foreign matter which is not possible where the screen openings are in the form of slots or other restricted openings. Moreover, since the screen may be rotated at a comparatively high speed the entire screen opening may be cleared once every second or thereabout, thus effectively preventing any clogging of the screen.

In the form of the invention illustrated in Figs. 6 and 7, sharp cutting teeth 31 are screwed or otherwise fastened to the outer faces of the screen units 22 and serve to break up debris, trash or other solid matter which is too large to pass through the spaces between the screen units, and, at the same time, the teeth 26 of the comb 27 serve to clear said spaces, as in the preferred form. In this case, the spaces between the teeth of the comb 27 are made sufficiently deep to permit the cutting teeth 31 to pass therethrough.

It will be understood that any material caught between the cutting teeth 31 and the comb 27 will be broken up, and that when reduced sufficiently, such material may pass through the spaces between the screen units. This form of the invention is used where it is not essential that the foreign matter be separated from the water so long as it is broken up into small fragments capable of passing through the spaces between the screen units.

The screen may be machined to size and the openings between the screen units machined to exact size after the screen units have been assembled. As a result a close fit may be had between the teeth of the comb and the sides of the screen unit without any danger of binding.

I claim as new, and desire to secure by Letters Patent:

1. A screen comprising a rotatory drum-like screen composed of spaced apart ring-like screen units rigidly secured together and having cutting teeth upon their outer peripheries, and a stationary mounted comb having teeth entering the spaces between the screen units.

2. A screen comprising a rotatable straining wall adapted to be interposed in a flowing stream containing solids, said wall having openings therein permitting liquid and material of small enough size to pass through said openings in the wall, a conduit in which the straining wall is interposed and through which the stream flows, the wall of said conduit serving to retain the strained out material in the stream, and submerged comminuting means carried in part by said wall for reducing the strained out material into small enough size to pass through said openings along with the flow of the liquid.

3. A screen comprising in combination a rotating slotted cylindrical straining wall adapted to be interposed in a flow of sewage for intercepting solids of a larger size than will pass through the slots in said wall, and comminuting means, part of which is mounted on the exterior of the cylinder straining wall and the other part of which is stationarily mounted, co-operating to reduce the intercepted solids to small enough size to pass through the slots along with the flow of liquid.

4. The method of straining sewage which consists in straining out solids from liquids in a flowing stream, and comminuting the intercepted solids below the surface of the stream without removing the intercepted solids from the stream, whereby the comminuted solids may pass through the straining means along with the flow of liquid.

5. A screen, comprising a cylindrical straining wall adapted to be interposed in a flowing stream containing solids, said wall having circumferential slots therein, permitting liquid and material of small enough size to pass through, a comb having teeth entering said slots, the wall and comb being relatively rotatable whereby the teeth of the comb rid said slots of accumulated matter, and comminuting means mounted on the outer face of the wall co-operating with the comb to reduce the strained out material to small enough size to pass through the slots in the wall.

CARL H. NORDELL.